(12) United States Patent
Tanaka et al.

(10) Patent No.: US 9,446,781 B2
(45) Date of Patent: Sep. 20, 2016

(54) STEERING SYSTEM

(71) Applicant: JTEKT CORPORATION, Osaka (JP)

(72) Inventors: Hidenobu Tanaka, Shiki-gun (JP);
Masayuki Nagaoka, Kashiba (JP);
Hiromitsu Tomiyama, Kashihara (JP);
Atsumune Nagatani, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/939,162

(22) Filed: Nov. 12, 2015

(65) Prior Publication Data

US 2016/0144885 A1 May 26, 2016

(30) Foreign Application Priority Data

Nov. 21, 2014 (JP) .................................. 2014-236696

(51) Int. Cl.
*B62D 1/184* (2006.01)

(52) U.S. Cl.
CPC ...................................... *B62D 1/184* (2013.01)

(58) Field of Classification Search
CPC ................................. B62D 1/18; B62D 1/184
See application file for complete search history.

(56) References Cited

U.S. PATENT DOCUMENTS

| | | | | |
|---|---|---|---|---|
| 5,743,150 A * | 4/1998 | Fevre | ...................... | B62D 1/184 280/775 |
| 5,787,759 A * | 8/1998 | Olgren | .................. | B62D 1/184 280/777 |
| 6,092,957 A * | 7/2000 | Fevre | ...................... | B62D 1/184 280/775 |
| 6,792,824 B2 * | 9/2004 | Jolley | .................... | B62D 1/184 280/775 |
| 7,635,149 B2 * | 12/2009 | Menjak | .................. | B62D 1/184 280/775 |
| 7,819,426 B2 * | 10/2010 | Streng | .................... | B62D 1/184 280/775 |
| 9,073,573 B2 * | 7/2015 | Sugiura | ..................... | B62D 1/18 |
| 2004/0261565 A1 * | 12/2004 | Uphaus | .................. | B62D 1/184 74/493 |
| 2009/0013817 A1 * | 1/2009 | Schnitzer | ............... | B62D 1/184 74/493 |

FOREIGN PATENT DOCUMENTS

| | | |
|---|---|---|
| DE | 10 2010 044753 A1 | 3/2012 |
| EP | 0734936 A2 | 10/1996 |
| EP | 2957480 A2 | 12/2015 |
| JP | H07-117685 A | 5/1995 |

OTHER PUBLICATIONS

Apr. 20, 2016 Extended Search Report issued in European Patent Application No. 15195093.8.

* cited by examiner

*Primary Examiner* — Drew Brown
(74) *Attorney, Agent, or Firm* — Oliff PLC

(57) ABSTRACT

In a steering system configured such that occurrence of a half lock is suppressed, when a body portion of a tooth member is pressed in a lock operation of locking the position of a steering column, the tooth member is extended to move a pair of second tooth row forming portions away from each other obliquely with respect to a lateral direction of an elongate tilt hole along the outer surface of a fastening side plate.

5 Claims, 4 Drawing Sheets

STATE A

STATE B

STATE C

STEERING SYSTEM

INCORPORATION BY REFERENCE

The disclosure of Japanese Patent Application No. 2014-236696 filed on Nov. 21, 2014 including the specification, drawings and abstract, is incorporated herein by reference in its entirety.

BACKGROUND OF THE INVENTION

1. Field of the Invention

The present invention relates to steering systems.

2. Description of the Related Art

Regarding steering systems that can make tilt adjustment, a technique is proposed in which a firm lock is achieved by causing movable teeth that move together with a steering column to mesh with stationary teeth fixed to a vehicle body when making tilt adjustment. See, e.g., United States Patent Application Publication No. US2009/0013817A1.

However, such steering systems may be locked with tooth top lands of the stationary teeth being in contact with tooth top lands of the movable teeth. In other words, what is called a half lock may occur in such steering systems.

SUMMARY OF THE INVENTION

It is an object of the present invention to provide a steering system configured so that occurrence of a half lock is suppressed.

A steering system according to an aspect of the present invention includes: a steering shaft; a steering column having the steering shaft passed therethrough to support the steering shaft; a first bracket fixed to the steering column; a second bracket, which includes a pair of fastening side plates that fasten a pair of fastened side plates provided in the first bracket or on the steering column, and which is attached to a vehicle body; and a lock mechanism, which includes a fastening shaft that is passed through elongate holes formed in the pair of fastening side plates so as to extend in a longitudinal direction serving as a position adjustment direction, and a pair of fastening members supported by the fastening shaft, and which fastens the pair of fastening members onto the pair of fastening side plates via the fastening shaft to lock a position of the steering column. The lock mechanism includes a pair of first toothed portions provided on both sides of a pair of longitudinal edges of the elongate hole on an outer surface of at least one of the fastening side plates and projecting in a lateral direction of the elongate hole, and a tooth member interposed between a corresponding one of the fastening members and a corresponding one of the fastening side plates and including a pair of second toothed portions meshing with the pair of first toothed portions. The tooth member includes a body portion that is pressed in a fastening shaft direction by the corresponding fastening member, a pair of second toothed portion forming portions forming the pair of second toothed portions extending along the outer surface of the corresponding fastening side plate, and a motion translation mechanism that translates movement of the body portion in the fastening shaft direction, which occurs when the body portion is pressed by the corresponding fastening member, into extension movement of the tooth member, in which the tooth member is extended so as to move the pair of second toothed portion forming portions away from each other obliquely with respect to the lateral direction, along the outer surface of the corresponding fastening side plate.

According to the steering system of the above aspect, when the fastening member presses the body portion of the tooth member in a lock operation, the tooth member is extended so as to move the pair of second toothed portion forming portions away from each other obliquely with respect to the lateral direction of the elongate hole along the outer surface of the fastening side plate. Accordingly, even if tooth top lands of one of the second toothed portions contact tooth top lands of a corresponding one of the first toothed portions in an early stage of the lock operation, the other second toothed portion meshes with a corresponding one of the first toothed portions as the lock operation proceeds. As the other second toothed portion meshes with the corresponding first toothed portion, the entire tooth member is moved in the longitudinal direction, and the one second toothed portion also eventually meshes with the corresponding first toothed portion. Occurrence of what is called a half lock is suppressed in this manner.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereafter, embodiments of the present invention will be described with reference to the accompanying drawings.

Figure 1:
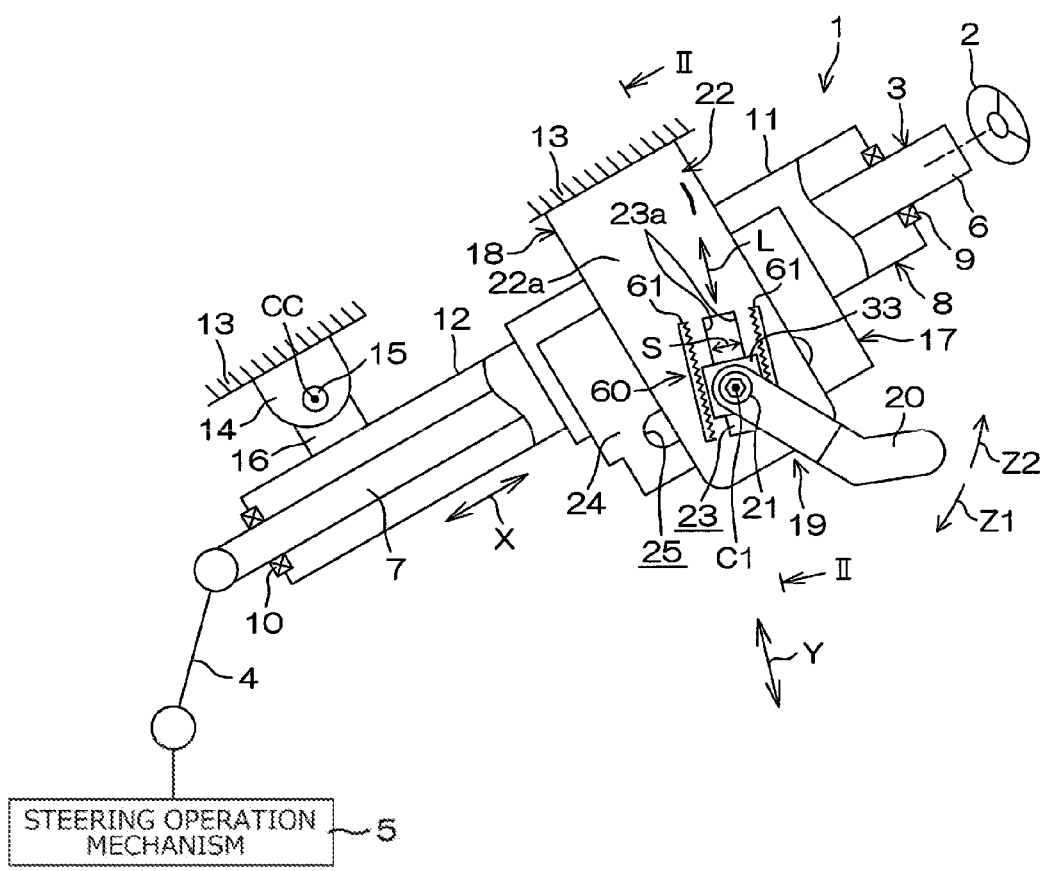
FIG. 1 is a schematic side view of a steering system according to a first embodiment of the present invention.

FIG. 1 is a partially cutaway schematic side view showing a general configuration of a steering system according to a first embodiment of the present invention. Referring to FIG. 1, a steering system 1 includes a steering member 2 such as a steering wheel, a steering shaft 3 having the steering member 2 coupled to its one end in an axial direction X, and a steering operation mechanism 5 coupled to the steering shaft 3 through an intermediate shaft 4 etc.

For example, the steering operation mechanism 5 is a rack-and-pinion mechanism for steering steered wheels (not shown) synchronously with a steering operation of the steering member 2. Rotation of the steering member 2 is transmitted to the steering operation mechanism 5 through the steering shaft 3, the intermediate shaft 4, etc. The rotation transmitted to the steering operation mechanism 5 is translated into axial movement of a rack shaft (not shown). The steered wheels are turned in this manner.

The steering shaft 3 has a tubular upper shaft 6 and a tubular lower shaft 7. The upper shaft 6 and the lower shaft 7 are fitted so as to be slidable relative to each other by, e.g., spline fitting or serration fitting. The steering member 2 is coupled to one end of the upper shaft 6. The steering shaft 3 can be extended and retracted in the axial direction X.

The steering system 1 further includes a hollow steering column 8 that rotatably supports the steering shaft 3. The steering shaft 3 is passed through the steering column 8 and is rotatably supported by the steering column 8 through a plurality of bearings 9, 10.

The steering column 8 has an upper tube 11 and a lower tube 12. For example, the upper tube 11 is an outer tube, and the lower tube 12 is an inner tube. The upper tube 11 and the lower tube 12 are fitted so as to be slidable relative to each other. The steering column 8 can be extended and retracted in the axial direction X. The upper tube 11 rotatably supports the upper shaft 6 through the bearing 9. The upper tube 11 is coupled to the upper shaft 6 through the bearing 9 so as to be movable together with the steering shaft 3 in the axial direction X.

The steering system 1 further includes a stationary bracket 14 that is fixed to a vehicle body 13, a tilt center shaft 15 supported by the stationary bracket 14, and a column bracket 16 fixed to the lower tube 12 and rotatably supported by the tilt center shaft 15. The steering column 8 and the steering shaft 3 can pivot (tilt) in a tilt direction Y about a tilt center CC that is a central axis of the tilt center shaft 15.

The position of the steering member 2 can be adjusted by pivoting (tilting) the steering shaft 3 and the steering column 8 about the tilt center CC. This adjustment is referred to as tilt adjustment. The position of the steering member 2 can also be adjusted by extending and retracting the steering shaft 3 and the steering column 8 in the axial direction X. This adjustment is referred to as telescopic adjustment.

The steering system 1 further includes a first bracket 17 fixed to the upper tube 11 of the steering column 8, a second bracket 18 that is fixed to the vehicle body 13, and a lock mechanism 19. The lock mechanism 19 fastens and locks the brackets 17, 18 to fix the position of the steering column 8 relative to the vehicle body 13, whereby the position of the steering member 2 is fixed.

The lock mechanism 19 includes an operation lever 20 and a fastening shaft 21 passed through the brackets 17, 18. The operation lever 20 is operated by a driver to rotate, and the fastening shaft 21 can rotate together with the operation lever 20. A central axis C1 of the fastening shaft 21 corresponds to the rotation center of the operation lever 20. The operation lever 20 is operated in a lock direction Z1 and an unlock direction Z2 that is an opposite direction to the lock direction Z1.

Elongate holes 23 for tilting (hereinafter referred to as tilt holes 23) are formed to extend through a pair of fastening side plates 22 (only one of the fastening side plates 22 is shown in FIG. 1) of the second bracket 18. The tilt holes 23 are long in the tilt direction Y. Elongate holes 25 for telescopic extension and retraction (hereinafter referred to as telescopic holes 25) are formed to extend through a pair of fastened side plates 24 (only one of the fastened side plates 24 is shown in FIG. 1) of the first bracket 17. The telescopic holes 25 are long in a telescopic direction (corresponding to the axial direction X). The fastening shaft 21 is passed through the tilt holes 23 and the telescopic holes 25.

Each of the tilt holes 23 has a pair of longitudinal edges 23a that are long in the tilt direction Y. The tilt holes 23 have a longitudinal direction L corresponding to the tilt direction Y and a lateral direction S that is a direction in which the pair of longitudinal edges 23a face each other.

The lock mechanism 19 further includes a pair of tooth lock mechanisms 60 for increasing a lock retaining force. Each of the tooth lock mechanisms 60 includes a pair of first tooth rows 61 serving as a pair of first toothed portions provided on an outer surface 22a of a corresponding one of the fastening side plates 22, and second tooth rows 62 serving as second toothed portions meshing with the pair of first tooth rows 61 (the second tooth rows 62 are not shown as they are behind one fastening member 33 in FIG. 1).

The pair of first tooth rows 61 are provided on both sides of the pair of longitudinal edges 23a of the tilt hole 23 on the outer surface 22a of the fastening side plate 22 and face each other in the lateral direction S. Each of the first tooth rows 61 is comprised of a plurality of parallel teeth arranged next to each other in the longitudinal direction L and projecting in the lateral direction S of the tilt hole 23.

Figure 4:
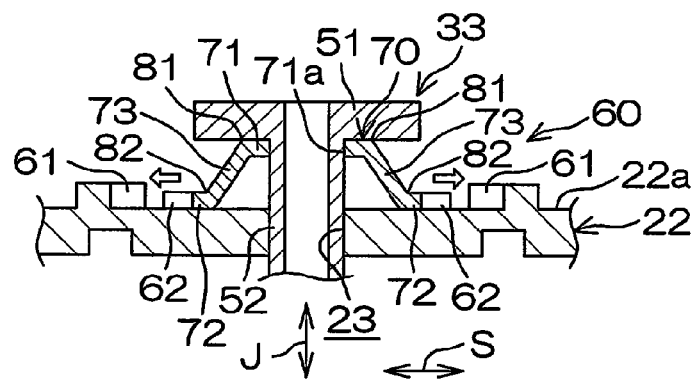
FIG. 4 is a schematic sectional view of the tooth lock mechanism.

The pair of first tooth rows 61 are formed by pressing the fastening side plate 22 from its backside (inner surface side) so that the pair of first tooth rows 61 protrude from the outer surface 22a of the fastening side plate 22 (see FIG. 4). The first tooth rows 61 are thus made of the same material as the fastening side plate 22 and formed integrally with the fastening side plate 22. This increases shear strength of each tooth of the first tooth rows 61.

Figure 2:
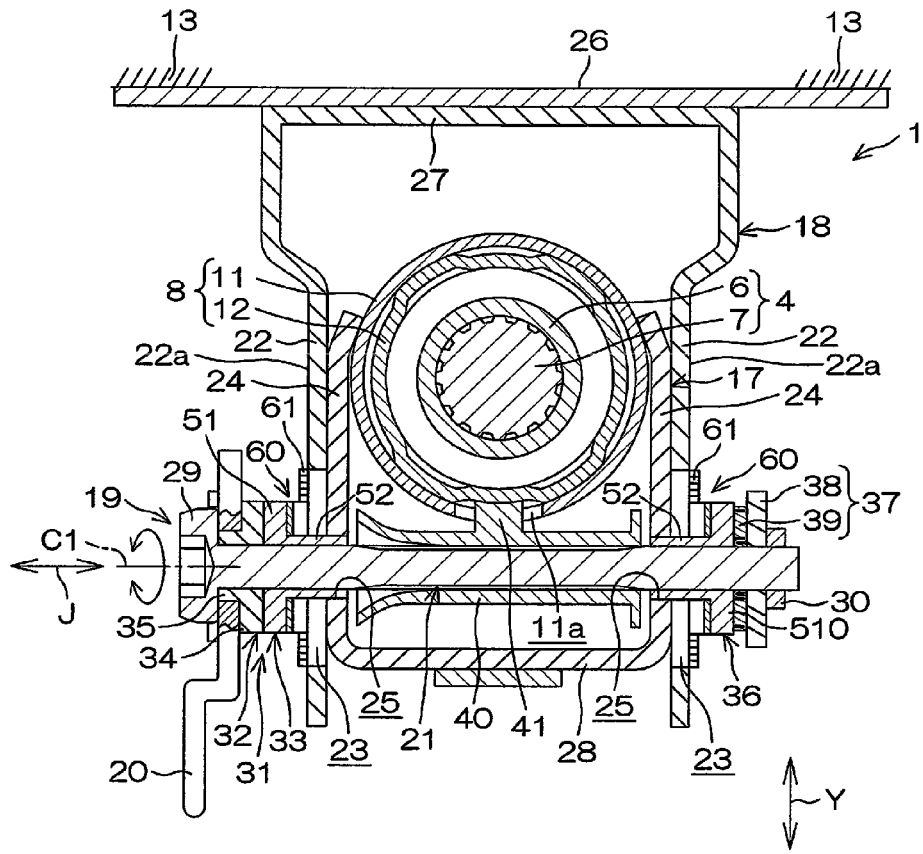
FIG. 2 is a schematic sectional view of the steering system taken along line II-II in FIG. 1.

As shown in FIG. 2, the second bracket 18 includes an attachment plate 26 detachably supported on the vehicle body 13 via a capsule mechanism, not shown, a top plate 27 fixed along the attachment plate 26, and the pair of fastening side plates 22 extending downward in the tilt direction Y from both ends of the top plate 27.

The first bracket 17 is in the shape of a groove having the pair of fastened side plates 24 facing the pair of fastening side plates 22 of the second bracket 18, and a connecting plate 28 connecting the lower ends in the tilt direction Y of the pair of fastened side plates 24.

The fastening shaft 21 is formed of a bolt that extends through the tilt holes 23 in the fastening side plates 22 of the second bracket 18 and the telescopic holes 25 in the fastened side plates 24 of the first bracket 17. A head 29 at one end of the fastening shaft 21 is fixed so as to be rotatable together with the operation lever 20. A nut 30 is screwed on a threaded portion at the other end of the fastening shaft 21.

The lock mechanism 19 includes the operation lever 20, the fastening shaft 21, a fastening mechanism 31, and the tooth lock mechanisms 60 for increasing a lock retaining force. The fastening mechanism 31 achieves, according to the rotation operation of the operation lever 20, tilt lock in which the position of the steering member 2 is fixed after tilt adjustment and telescopic lock in which the position of the steering member 2 is fixed after telescopic adjustment.

The fastening mechanism 31 includes a rotary cam 32, a pair of fastening members 33, 36, the nut 30, and an interposing member 37. The rotary cam 32 rotates together with the operation lever 20. The one fastening member 33 forms a non-rotary cam that is cam-engaged with the rotary cam 32, and fastens one of the fastening side plates 22. The other fastening member 36 fastens the other fastening side plate 22. The interposing member 37 is interposed between the other fastening member 36 and the nut 30.

The operation lever 20, the rotary cam 32, and the one fastening member 33 as a non-rotary cam are interposed between the head 29 of the fastening shaft 21 and the one fastening side plate 22. The other fastening member 36 and the interposing member 37 are interposed between the nut 30 and the other fastening side plate 22 of the second bracket 18.

The rotary cam 32, the one fastening member 33 (non-rotary cam), the other fastening member 36, and the interposing member 37 are supported by the outer periphery of the fastening shaft 21. The fastening members 33, 36 are supported so as to be movable in a fastening shaft direction J that is the axial direction of the fastening shaft 21.

The rotary cam 32 is coupled so as to be rotatable together with the operation lever 20, so that movement in the fastening shaft direction J of the rotary cam 32 relative to the fastening shaft 21 is restricted. That is, rotation of the operation lever 20 relative to the head 29 of the fastening shaft 21 is restricted. The rotary cam 32 includes a pressing plate 34 having a hole, and a boss 35. The boss 35 is provided around the hole of the pressing plate 34 and is passed through an insertion hole of the operation lever 20 so as to be rotatable together with the operation lever 20.

The one fastening member 33 (non-rotary cam) includes a pressing plate 51 having a hole, and a boss 52 provided around the hole of the pressing plate 51. The other fastening member 36 includes a pressing plate 510 having a hole, and a boss 52 provided around the hole of the pressing plate 510.

The pressing plate 51 of the one fastening member 33 is different from the pressing plate 510 of the other fastening member 36 only in that the pressing plate 51 of the one fastening member 33 has a cam protrusion or a cam surface, not shown.

At least one of the surface of the pressing plate 34 of the rotary cam 32 and the surface of the pressing plate 51 of the non-rotary cam (one fastening member 33) which face each other in the axial direction has a cam protrusion (not shown), and the other surface has a cam surface (not shown) that is engaged with the cam protrusion. When the rotary cam 32 is rotated, the cam protrusion and the cam surface move relative to each other accordingly. The rotation of the rotary cam 32 is thus translated into movement in the fastening shaft direction J of the one fastening member 33 (non-rotary cam).

An outer periphery 52a (see FIG. 3) of the boss 52 of each fastening member 33, 36 has a rectangular shape in section. An inner periphery of the boss 52 has a circular shape conforming to an outer periphery of the fastening shaft 21. As shown in FIG. 2, the boss 52 of each fastening member 33, 36 is passed through the tilt hole 23 of a corresponding one of the fastening side plates 22 and the telescopic hole 25 of a corresponding one of the fastened side plates 24.

Figure 3:
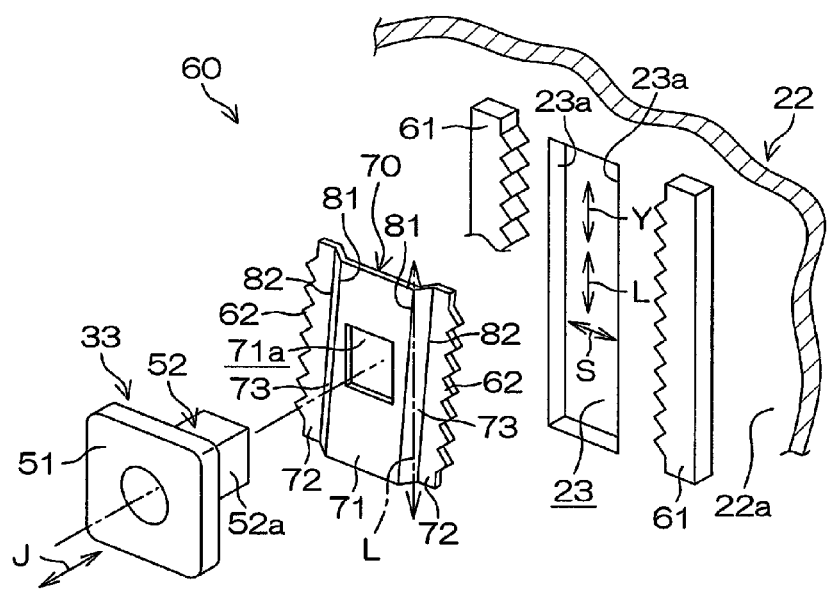
FIG. 3 is an exploded perspective view of a tooth lock mechanism.

As shown in FIG. 3, one of two pairs of sides of the outer periphery 52a of each boss 52 are engaged with the pair of longitudinal edges 23a of the tilt hole 23 of a corresponding one of the fastening side plates 22. Each boss 52 is thus guided in the tilt direction Y.

The other pair of sides of the outer periphery 52a of each boss 52 are engaged with a pair of longitudinal edges (not shown) of the telescopic hole 25 of a corresponding one of the fastened side plates 24. Each boss 52 is thus guided in the telescopic direction (axial direction X).

The interposing member 37 includes a thrust washer 38 interposed between the nut 30 and the pressing plate 510 of the other fastening member 36, and a needle roller thrust bearing 39 interposed between the thrust washer 38 and the pressing plate 510 of the other fastening member 36.

When the operation lever 20 is rotated, the rotary cam 32 is rotated relative to the one fastening member 33 (non-rotary cam) accordingly. The one fastening member 33 is thus moved in the fastening shaft direction J of the fastening shaft 21. The pair of fastening side plates 22 of the second bracket 18 are held and fastened between the moved one fastening member 33 and the other fastening member 36. The pair of fastening side plates 22 of the second bracket 18 thus fasten the fastened side plates 24 of the first bracket 17. The tilt lock and the telescopic lock are achieved in this manner.

The lock mechanism 19 has a function to suppress backlash between the tubes 11, 12 that are in the telescopic locked state. Specifically, the lock mechanism 19 includes a sleeve 40 and a pressing portion 41. The sleeve 40 is fitted on the outer periphery of an intermediate portion of the fastening shaft 21 in the fastening shaft direction J so as to rotate together with the fastening shaft 21, and is rotated when the operation lever 20 is operated to rotate. The pressing portion 41 is formed of a cam protrusion and is formed on the outer periphery of the sleeve 40 so as to be rotatable together with the sleeve 40.

When the operation lever 20 is operated, the sleeve 40 is rotated accordingly, and the pressing portion 41 presses the lower tube 12 (inner tube) upward through an opening 11a of the upper tube 11 (outer tube). The lower tube 12 is thus pressed against the upper tube 11 in a radial direction. This suppresses backlash in the radial direction of the lower tube 12 relative to the upper tube 11.

The lock mechanism 19 includes the pair of tooth lock mechanisms 60 for increasing a lock retaining force (force that retains the locked state in a lock operation). One of the pair of tooth lock mechanisms 60 is associated with the one fastening member 33, and the other tooth lock mechanism 60 is associated with the other fastening member 36. Since both of the tooth lock mechanisms 60 have the same configuration, the tooth lock mechanism 60 associated with the one fastening member 33 will be described below.

As shown in an exploded perspective view of FIG. 3, the tooth lock mechanism 60 includes a tooth member 70 interposed between the fastening member 33 and the fastening side plate 22. For example, the tooth member 70 may be formed by plate working of a plate material. The tooth member 70 includes the pair of second tooth rows 62 serving as the pair of second toothed portions meshing with the pair of first tooth rows 61. The pair of first tooth rows 61 are in phase with each other.

That is, as shown in FIGS. 3 and 4, the tooth member 70 further includes a plate-like body portion 71, a pair of plate-like second tooth row forming portions 72 (second toothed portion forming portions), and a pair of leg portions 73. The body portion 71 is pressed in the fastening shaft direction J by the fastening member 33. The pair of second tooth row forming portions 72 form the pair of second tooth rows 62 along the outer surface 22a of the fastening side plate 22. The pair of leg portions 73 serve as a motion translation mechanism that translates motion of the body portion 71 into motion of the pair of second tooth row forming portions 72.

Figure 5A:
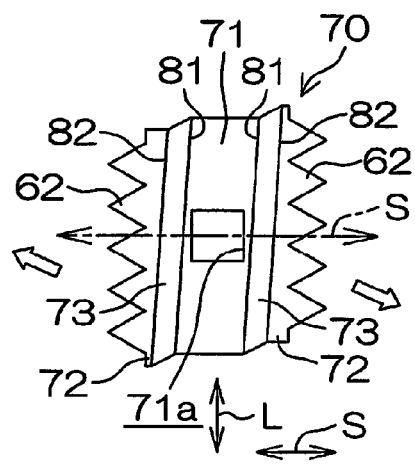
FIG. 5A is a front view of a tooth member of the tooth lock mechanism, showing the state at the time an operation of restoring the tooth member from an extended state (unlock operation) is performed.
Figure 5B:
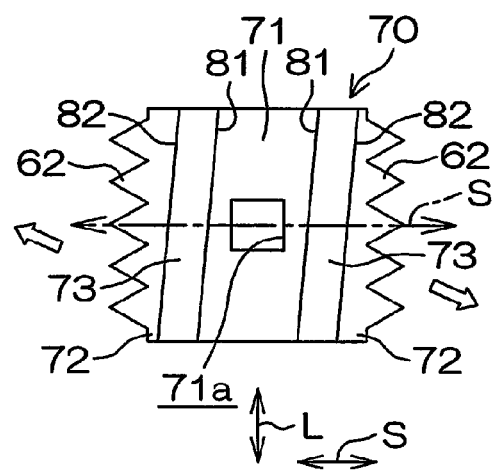
FIG. 5B is a front view of the tooth member of the tooth lock mechanism, showing the state at the time an operation of extending the tooth member (lock operation) is performed.

Specifically, the leg portions 73 serving as the motion translation mechanism function to translate movement of the body portion 71 in the fastening shaft direction J, which occurs when the body portion 71 is pressed by the fastening member 33, into extension movement of the tooth member 70, in which the tooth member 70 is extended so as to move the pair of second tooth row forming portions 72 away from each other obliquely with respect to the lateral direction S, along the outer surface 22a of the fastening side plate 22 (as shown by white arrows in FIGS. 4, 5A, and 5B).

Each of the pair of leg portions 73 serving as the motion translation mechanism connects the body portion 71 to a corresponding one of the second tooth row forming portions 72.

Each leg portion 73 is connected to the body portion 71 via a first fold line 81. Each leg portion 73 is connected to a corresponding one of the second tooth row forming portions 72 via a second fold line 82. The tooth member 70 is mountain-folded along the first fold lines 81 between the body portion 71 and each leg portion 73, and is valley-folded along the second fold lines 82 between each leg portion 73 and each second tooth row forming portion 72. Each leg portion 73 has elasticity so that it can move the body portion 71 and a corresponding one of the second tooth row forming portions 72 away from each other in the fastening shaft direction J.

As shown in FIG. 3, the first fold lines 81 and the second fold lines 82 are parallel to the outer surface 22a of the fastening side plate 22 and extend in a direction tilted with respect to the longitudinal direction L.

As shown in FIG. 5A, the pair of leg portions 73 serving as the motion translation mechanism therefore function to shift the phases of the pair of second tooth rows 62 from each other when an operation of restoring the tooth member 70 from the extended state (the state where the pair of second tooth row forming portions 72 are moved away from each other) (unlock operation) is performed. For example, the amount of phase shift may be half the tooth pitch or less than half the tooth pitch.

As shown in FIG. 5B, the pair of leg portions 73 serving as the motion translation mechanism also function to make the pair of second tooth rows 62 in phase with each other when an operation of extending the tooth member 70 to move the pair of second tooth row forming portions 72 away from each other (lock operation) is performed.

The body portion 71 of the tooth member 70 has a boss insertion hole 71a through which the boss 52 of the fastening member 33 is passed.

According to the present embodiment, when the fastening member 33 presses the body portion 71 of the tooth member 70 in the lock operation, the tooth member 70 is extended so as to move the pair of second tooth row forming portions 72 away from each other obliquely with respect to the lateral direction S of the tilt hole 23 along the outer surface 22a of the fastening side plate 22 (see FIGS. 5A and 5B).

Figure 6:
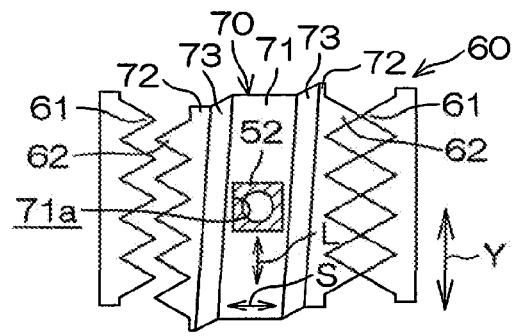
FIG. 6 shows schematic views of the tooth lock mechanism, sequentially showing the lock operation in states A to C.
Figure 6:
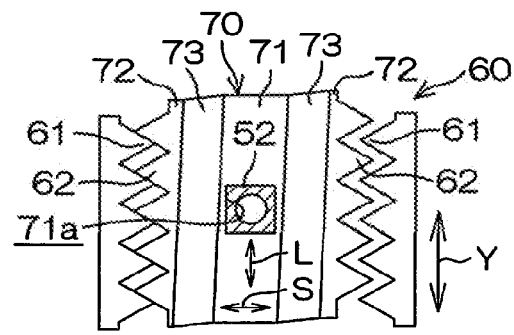
Figure 6:
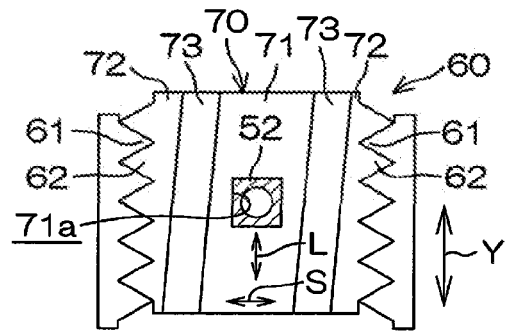

Accordingly, for example, even if tooth top lands of the right second tooth row 62 contact tooth top lands of the right first tooth row 61 in the early stage of the lock operation as shown by state A in FIG. 6, the left second tooth row 62 shifted in phase from the right second tooth row 62 meshes with the left first tooth row 61 as shown by state B in FIG. 6 as the lock operation proceeds.

As the left tooth rows 61, 62 mesh with each other, the entire tooth member 70 is moved in the longitudinal direction L, and the right second tooth row 62 eventually meshes with the right first tooth row 61 as shown by state C in FIG. 6. Occurrence of a half lock is suppressed in this manner.

As described above, occurrence of a half lock is suppressed during the lock operation, namely the operation of extending the tooth member 70 so as to move the pair of second tooth row forming portions 72 from the state where the second tooth rows 62 are shifted in phase from each other to the state where the second tooth rows 62 are in phase with each other.

In the pair of leg portions 73 serving as the motion translation mechanism, the first fold lines 81 and the second fold lines 82 are parallel to the outer surface 22a of the fastening side plate 22 and extend in a direction tilted with respect to the longitudinal direction L. Accordingly, as the body portion 71 pressed by the fastening member 33 moves in the fastening shaft direction J, the second fold lines 82 tilted with respect to the longitudinal direction L are translated with respect to the first fold lines 81 along the outer surface 22a of the fastening side plate 22. The function of the second tooth row forming portions 72 to move obliquely with respect to the lateral direction S as shown in FIGS. 5A and 5B can thus be implemented.

Figure 7:
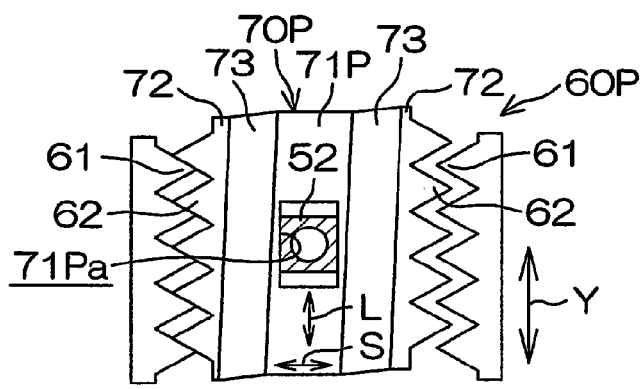
FIG. 7 is a schematic view of a tooth lock mechanism according to a second embodiment of the present invention.

FIG. 7 is a schematic view of a tooth lock mechanism 60P according to a second embodiment of the present invention. The tooth lock mechanism 60P of the second embodiment shown in FIG. 7 is different from the tooth lock mechanism 60 of the first embodiment shown in FIG. 6 in that the boss 52 of the fastening member 33 is passed through a boss insertion hole 71Pa of a body portion 71P of a tooth member 70P with play in the longitudinal direction L. For example, the boss insertion hole 71Pa is an elongate hole extending in the longitudinal direction L.

According to the second embodiment, the tooth member 70P can move in the longitudinal direction L of the tilt hole 23 (the direction in which the teeth of the first tooth rows 61 are arranged) with respect to the boss 52 of the fastening member 33 supported by the fastening shaft 21 by an amount corresponding to the play. Stepless positional adjustment can thus be achieved.

In the above embodiments, the pair of fastened side plates 24 of the first bracket 17 are fixed to the upper tube 11 that is the outer tube of the steering column 8. However, the configuration of the present invention is not limited to this. For example, although not shown in the figures, the steering column may have a lower outer tube having a slit and capable of elastically contracting so as to be reduced in diameter, and a pair of fastened side plates and the lower outer tube may be formed as a single-piece member by using a single material so that the pair of fastened side plates are located on both sides of the slit. In this case, a tilt lock is achieved when the pair of fastening side plates fasten the pair of fastened side plates integral with the steering column. A telescopic lock is achieved when the outer tube is reduced in diameter and the inner tube is locked in the extension/retraction direction.

Although the pair of tooth lock mechanisms 60 are provided in the above embodiments, the present invention is not limited to this. Only the tooth lock mechanism 60 associated with one of the fastening members 33, 36 may be provided.

The pair of first tooth rows may be configured so as to be shifted in phase from each other. In this case, the pair of second tooth rows may be made in phase with each other when the operation of restoring the tooth member from the extended state (the state where the pair of second tooth row forming portions are moved away from each other) (unlock operation) is performed, and each of the pair of second tooth rows may be made in phase with a corresponding one of the first tooth rows when the operation of extending the tooth member to move the pair of second tooth row forming portions away from each other (lock operation) is performed.

In the above embodiments, the first toothed portion is formed as the first tooth row, and the second toothed portion is formed as the second tooth row. However, the present invention is not limited to this, and either the first toothed portion or the second toothed portion may be formed as a single tooth.

The first tooth row (first toothed portion) may be formed by a member separate from the fastening side plate 22 and may be integrally fixed to the fastening side plate 22.

What is claimed is:

1. A steering system, comprising:
   a steering shaft;
   a steering column having the steering shaft passed therethrough to support the steering shaft;
   a first bracket fixed to the steering column;
   a second bracket, which includes a pair of fastening side plates that fasten a pair of fastened side plates provided in the first bracket or on the steering column, and which is attached to a vehicle body; and
   a lock mechanism, which includes a fastening shaft that is passed through elongate holes formed in the pair of fastening side plates so as to extend in a longitudinal direction serving as a position adjustment direction, and a pair of fastening members supported by the fastening shaft, and which fastens the pair of fastening members onto the pair of fastening side plates via the fastening shaft to lock a position of the steering column; wherein
   the lock mechanism includes a pair of first toothed portions provided on both sides of a pair of longitudinal edges of the elongate hole on an outer surface of at least one of the fastening side plates and projecting in a lateral direction of the elongate hole, and a tooth member interposed between a corresponding one of the fastening members and a corresponding one of the fastening side plates and including a pair of second toothed portions meshing with the pair of first toothed portions, and
   the tooth member includes a body portion that is pressed in a fastening shaft direction by the corresponding fastening member, a pair of second toothed portion forming portions forming the pair of second toothed portions extending along the outer surface of the corresponding fastening side plate, and a motion translation mechanism that translates movement of the body portion in the fastening shaft direction, which occurs when the body portion is pressed by the corresponding fastening member, into extension movement of the tooth member, in which the tooth member is extended so as to move the pair of second toothed portion forming portions away from each other obliquely with respect to the lateral direction, along the outer surface of the corresponding fastening side plate.

2. The steering system according to claim 1, wherein each of the first toothed portions is formed as a first tooth row in which a plurality of teeth are arranged in the longitudinal direction of the elongate hole, and each of the second toothed portions is formed as a second tooth row that meshes with a corresponding one of the first tooth rows.

3. The steering system according to claim 1, wherein the motion translation mechanism functions to shift phases of the pair of second toothed portions from each other when an operation of restoring the tooth member from an extended state where the pair of second toothed portion forming portions are moved away from each other is performed, and to make the pair of second toothed portions in phase with each other when an operation of extending the tooth member to move the pair of second toothed portion forming portions away from each other is performed.

4. The steering system according to claim 1, wherein the corresponding fastening member includes a boss through which the fastening shaft is passed, which is passed through the elongate hole of the fastening side plate, and which is guided in the longitudinal direction by the elongate hole when positional adjustment is made, and
   the body portion of the tooth member includes a boss insertion hole through which the boss is passed with play in the longitudinal direction.

5. The steering system according to claim 1, wherein the motion translation mechanism is a pair of leg portions each connecting the body portion and a corresponding one of the second toothed portion forming portions,
   the tooth member is mountain-folded along first fold lines between each of the leg portion and the body portion, and is valley-folded along second fold lines between each of the leg portions and each of the second toothed portion forming portions, and
   the first fold lines and the second fold lines are parallel to the outer surface of a corresponding fastening side plate and extend in a direction tilted with respect to the longitudinal direction.

* * * * *